United States Patent
Wagh

(10) Patent No.: US 11,720,341 B2
(45) Date of Patent: Aug. 8, 2023

(54) SIMULATION OF UPDATES IN A SOFTWARE DEFINED NETWORK (SDN) VIRTUALIZED COMPUTING ENVIRONMENTS

(71) Applicant: VMware, Inc., Palo Alto, CA (US)

(72) Inventor: Shweta Prakash Wagh, Pune (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/494,023

(22) Filed: Oct. 5, 2021

(65) Prior Publication Data

US 2023/0104734 A1  Apr. 6, 2023

(51) Int. Cl.
*G06F 8/65* (2018.01)
*G06F 9/455* (2018.01)
*G06F 9/54* (2006.01)

(52) U.S. Cl.
CPC .......... *G06F 8/65* (2013.01); *G06F 9/45558* (2013.01); *G06F 9/54* (2013.01); *G06F 2009/45595* (2013.01)

(58) Field of Classification Search
CPC .......... G06F 8/65; G06F 9/45558; G06F 9/54; G06F 2009/45595
See application file for complete search history.

(56) References Cited

U.S. PATENT DOCUMENTS

| | | | | |
|---|---|---|---|---|
| 10,268,470 | B2 * | 4/2019 | Savagaonkar | G06F 9/45558 |
| 10,747,564 | B2 * | 8/2020 | Antony | G06F 9/45558 |
| 2018/0060061 | A1 * | 3/2018 | Savagaonkar | G06F 8/65 |
| 2018/0246710 | A1 * | 8/2018 | Kim | G06F 9/4406 |
| 2019/0026175 | A1 * | 1/2019 | Shelke | G06F 11/0775 |
| 2019/0317751 | A1 * | 10/2019 | Ramsay | G06F 8/65 |
| 2020/0133704 | A1 * | 4/2020 | Habkost | G06F 9/45508 |

OTHER PUBLICATIONS

Chen et al., "Software-Defined Network Virtualization Platform for Enterprise Network Resource Management" (Year: 2014).*

* cited by examiner

*Primary Examiner* — Phillip H Nguyen

(57) ABSTRACT

Described herein are systems, methods, and software to manage the simulation of an update to a software defined networking (SDN) virtualization platform in a computing environment. In one example, an update service identifies a request to simulate the update of a SDN virtualization platform from a first version to a second version. In response to the request, the update service will identify and provide one or more updated files associated with the second version to computing systems in the computing environment and update an application programming interface (API) configuration on the computing systems to direct API requests to the one or more updated files in places of one or more files associated with the first version. The update service further maintains a cache associated with modifications to the computing environment while the API configuration is updated.

20 Claims, 7 Drawing Sheets

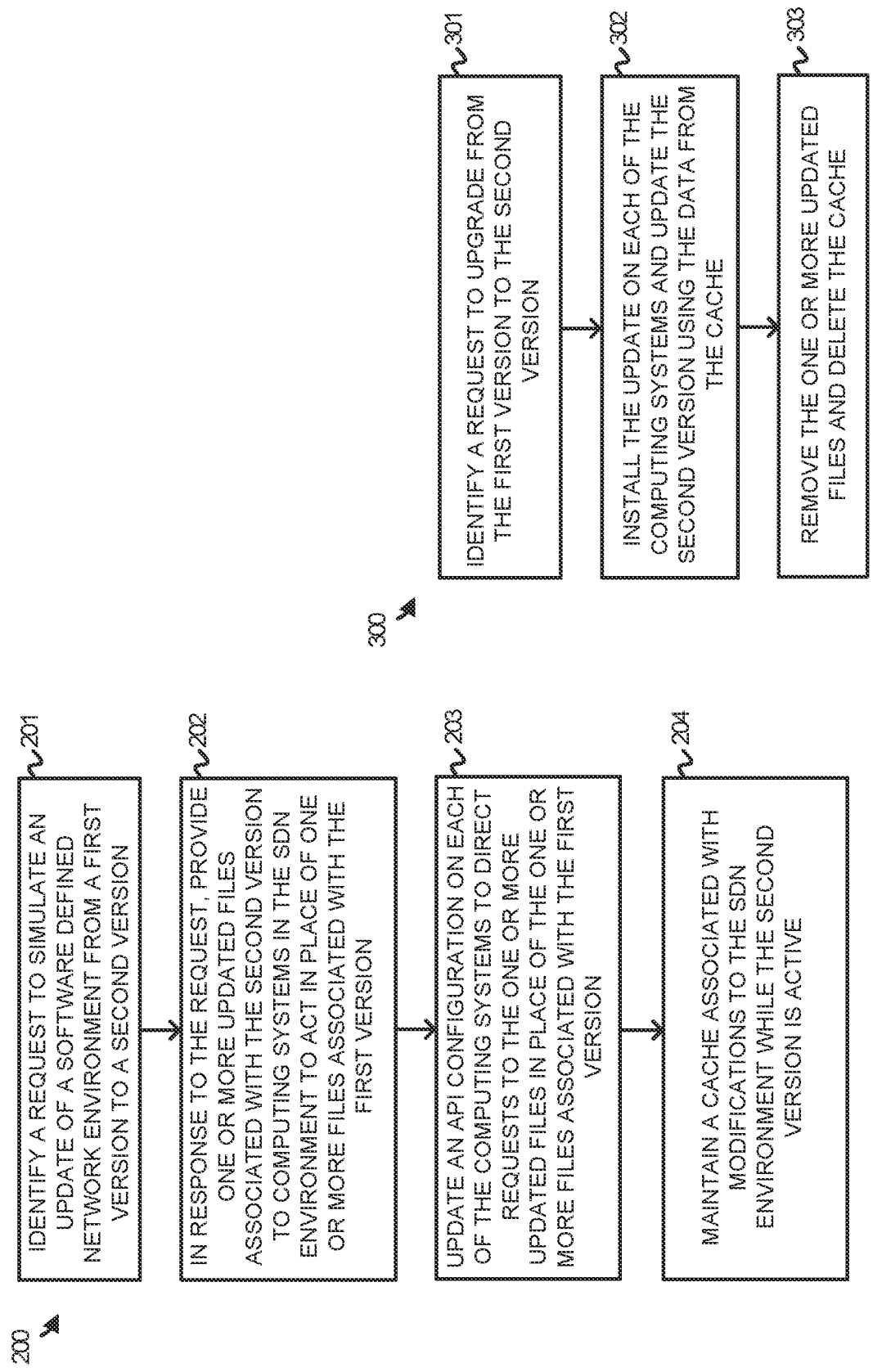

SIMULATION OF UPDATES IN A SOFTWARE DEFINED NETWORK (SDN) VIRTUALIZED COMPUTING ENVIRONMENTS

BACKGROUND

In computing environments, virtualization platforms are used to abstract the physical resources of the computing systems and provide the abstracted resources to virtual nodes. The virtual nodes may comprise full operating system virtual machines, containers, or some other virtualized endpoint. In some examples, the virtualization platforms can be used to provide networking operations for the virtual nodes. The networking operations may include switching operations, firewall operations, routing operations, encapsulation operations, or some other networking operation. The networking provided by the virtualization platform may be divided into the data plane, the control plane, and the management plane. The control plane controls how the data is forwarded, while the data plane implements the rules provided by the control plane. The management plane provides an interface that permits an administrator of the network to identify status information associated with the network and apply configuration changes that are implemented via the control plane.

In some examples, the network virtualization platform that provides the networking operations may use various files to provide the different operations. These files may include executable files, libraries, or some other file type. Traditionally, when an update is required for the virtualization platform the files for a first version are replaced by the files for the second version. However, if the update causes problems within the computing environment, difficulties can arise in reverting to the earlier version, including downtime and reconfiguration operations for the computing environment.

SUMMARY

The technology disclosed herein manages the simulation of updates in software defined network (SDN) virtualized computing environments. In one implementation, a method includes identifying a request to simulate an update of a SDN virtualization platform from a first version to a second version in a computing environment and, in response to the request, identifying one or more updated files that are different in the second version from the first version. The method further includes providing the one or more updated files to one or more computing systems in the computing environment and updating an application programming interface (API) configuration on each of the one or more computing systems to direct requests to the one or more updated files in place of one or more files associated with the first version. Once updated, the method also provides for maintaining a cache associated with modifications to the computing environment while the API configuration is updated.

In one implementation, the method further includes identifying a request to update the SDN virtualization platform from the first version to the second version and installing the second version of the SDN virtualization platform on the one or more computing systems. Once installed and configured using the cache, the method deletes the one or more updated files used during the simulation.

BRIEF DESCRIPTION OF THE DRAWINGS

FIG. 2 illustrates a method of simulating an update of an SDN virtualized computing environment according to an implementation.

FIG. 3 illustrates a method of upgrading an SDN virtualized computing environment according to an implementation.

DETAILED DESCRIPTION

Figure 1:
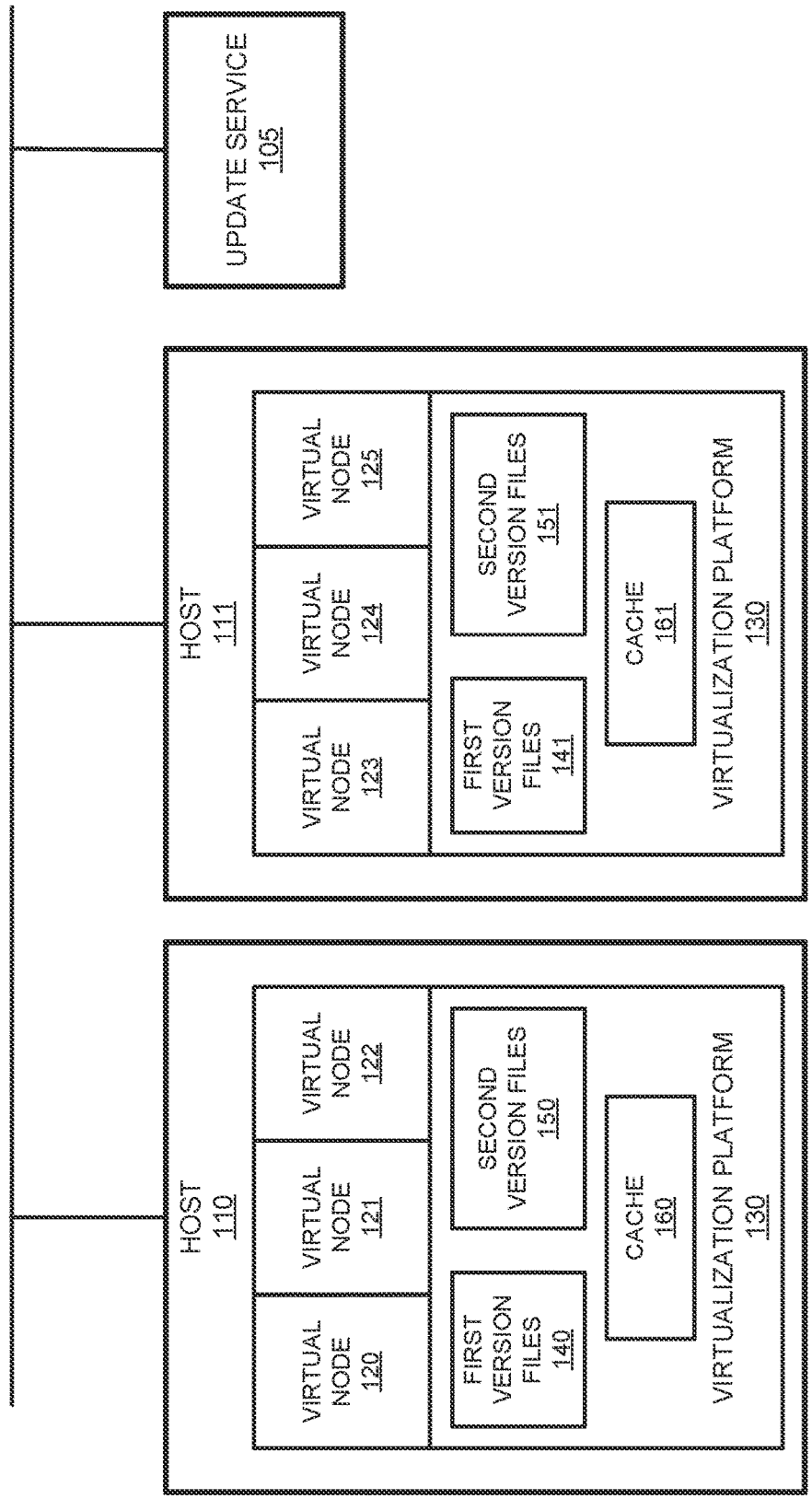
FIG. 1 illustrates a software defined network (SDN) virtualized computing environment to simulate updates for the computing environment according to an implementation.

FIG. 1 illustrates a software defined network (SDN) virtualized computing environment 100 (hereinafter SDN computing environment 100) to simulate updates for the computing environment according to an implementation. SDN computing environment 100 include hosts 110-111 and update service 105. Hosts 110-111 further include virtual nodes 120-125 and virtualization platform 130. Virtualization platform 130 further include first version files 140-141, second version files 150-151, and caches 160-161. It should be recognized that SDN computing environment 100 shown in FIG. 1 is greatly simplified from typical SDN computing environments to show only features necessary for illustration of the features and methods of the technology described herein.

In SDN computing environment 100, virtualization platform 130 is used to support virtual nodes 120-125. Virtualization platform 130 may comprise an operating system, a hypervisor, or some other software capable of supporting the execution of virtual nodes 120-125. Virtual nodes 120-125 may each comprise full operating system virtual machines, containers, or some other virtualized endpoint. Virtualization platform 130 may be used to abstract the physical components of hosts 110-111 and provide the abstracted components to virtual nodes 120-125. The abstracted components may include processing resources, memory resources, storage resources, network resources, or some other resource. Virtualization platform 130 may be used to provide SDN operations for the virtual nodes, wherein the operations may include switching operations, firewall operations, routing operations, encapsulation operations, or some other networking operation.

Within virtualization platform 130 are first version files 140-141 that are used to provide a first version of the virtualization platform. First version files may include executables, libraries, scripts, or some other type of file that are used to support the operations of the virtual nodes. In at least one implementation, first version files 140-141 may include files that are used to provide the SDN operations in SDN computing environment 100. Although demonstrated with virtual nodes on each of hosts 110-111, a host or other computing system may be used to provide networking operations, such as an edge gateway for ingress and egress packets to an external network, such as the internet. In some examples, first version files 140-141 may represent control plane files that are used configure and manage the data plane, management plane files that are used to interface with an administrator of the network and interact with the control plane, and data plane files that are used to process packets as they traverse the data plane of the computing environment.

Here, an administrator of SDN computing environment 100 generates a request to simulate an update of the virtualization platform from a first version to a second version, wherein a subset of the files for the second version are different than the first version. Rather than implementing the full upgrade in SDN computing environment 100, update service 105 may use redirects or a shim layer to simulate the full update in the computing environment. A shim layer is used to identify API requests and direct the requests to an appropriate file or files on a computing system. In at least one implementation, update service 105 may identify one or more files that are different from the second version over the first version. Once identified, the one or more files may be distributed to the hosts of the SDN computing environment 100. After distributing the files, API configurations, such as a shim layer, can be updated to direct requests to the one or more files associated with the second version in place of one or more files associated with the first version. Using the example of host 110, second version files 150 are provided to support the update of the virtualization platform. Once stored, configurations on host 110 may be updated to direct requests, such as API requests, to second version files 150 in place of files in first version files 140.

Once the requests are directed to the files associated with the second version, cache 160 may be used to cache configuration change information for SDN computing environment 100. The configuration changes may include, but are not limited to, adding one or more hosts, edge gateways, or other configuration changes in the environment. The configuration changes may also include newly added or modified data model objects or attributes for existing hosts and edge gateways. In some implementations, cache 160 may further include scripts or other data that can be used to update the schema in one or more databases following a user selection to complete the update from the first version to the second version. Cache 160 may be implemented, e.g., using techniques described in U.S. Patent Application Pub. 2018/0006902, which is incorporated herein by reference.

Once the simulation is executed over a period, an administrator associated with SDN computing environment 100 may determine whether to implement the update to the platform. If the administrator chooses not to update the platform, then the API configuration can be updated to direct requests to the files and/or libraries associated with the first version. In some examples, the cache may also be used to update any files or libraries based on the configuration changes. In other examples, the configuration information in the cache can be removed from the computing systems, including the addition of hosts or edges in the computing environment.

In some implementations, the administrator of SDN computing environment 100 may request to implement the update of the virtualization platform from the first version to the second version. In response to the request, the second version will be installed over the first version and the computing systems may be restarted with the updated version. Additionally, when the update is requested, the cache may be used to update any files and/or libraries associated with the second version using information about configuration changes during the simulation (e.g., updating a schema in one or more databases to bring the databases in accordance with the second version). Once updated and the second version is installed, the one or more updated files used during the simulation can be deleted along with the cache.

FIG. 2 illustrates a method 200 of simulating an update of an SDN virtualized computing environment according to an implementation. The steps in method 200 are referenced parenthetically in the paragraphs that follow with reference to systems and elements of SDN computing environment 100 of FIG. 1.

Method 200 includes identifying (201) a request to simulate an update of a SDN virtualization platform from a first version to a second version. In response to the request, method 200 further provides identifying one or more updated files that are different in the second version from the first version and providing (202) the one or more updated files to one or more computing systems in the SDN computing environment to act in place of one or more files associated with the first version. For example, an administrator may interact with update service 105 to request an update of the SDN virtualization platforms in computing environment 100. In response to the request, update service 105 may identify the files, including executables, libraries, and the like, that are different from the second version over the first version. Once the files are identified, the files are distributed to the one or more computing systems in the computing environment. For example, a second version of the SDN virtualization platform may include an updated python file. As a result, the updated python file may be distributed to the computing systems in the computing environment, while files that are unchanged are not distributed as part of the simulation.

Once the files are distributed, method 200 further includes updating (203) an application programming interface (API) configuration on each of the one or more computing systems to direct requests to the one or more updated files in place of one or more files associated with the first version. In some implementations, the update may be used to redirect API queries from a first executable or library associated with the first version of the platform to a second executable or library associated with the second version of the platform. Returning to the example of the updated python file. API requests identified in the platform may be directed to the updated python file in place of an existing python file for the first version. For example, an API request may be generated when a packet is identified from a virtual node with specific addressing attributes. This API request may be identified by the platform and directed to a file associated with the second version if available, otherwise, be directed to the file associated with the first version.

In addition to redirecting API requests and other transactions to the updated files in place of the files associated with the first version, method 200 also provides for maintaining (204) a cache associated with modifications to the computing environment while the API configuration is updated. The cache may include information about added hosts or edge systems, changes in addressing associated with elements in the computing environment, or some other modification associated with the computing environment. The cache may be used to update the second version if the full update is requested by the administrator of the computing environment or may be deleted if the administrator terminates the simulation without requesting the complete update to the second version. The cache may update the second version by updating one or more schemas for the second version using the configuration change information identified during the simulated update.

In one implementation, the simulation in computing environment may be executed for a period defined by the administrator that initiated the simulation. Once completed, the administrator may request that the full update be completed to convert the computing environment and platform from the first version to the second version. In another implementation, after the completion of the simulation, the user may decline to update the platform from the first version to the second version. In response to the indication from the administrator, the API configuration or any other configuration can be updated to direct requests to the files associated with the first version over the files associated with the second version. Once the requests are redirected, the files associated with the second version can be removed or deleted on the computing system. Additionally, configuration changes in the cache may be removed upon an indication from the administrator that the second version is not desired.

FIG. 3 illustrates a method 300 of upgrading an SDN virtualized computing environment according to an implementation. The steps of method 300 are referenced parenthetically in the paragraphs that follow with reference to systems and elements of computing environment 100 of FIG. 1. Method 300 is a continuation of the operations described in FIG. 2.

As described previously, an administrator may simulate the update of a virtualization platform by providing, from an update service, files associated with a second version of the virtualization platform to operate in place of the first version. The update service may also update pointers, such as API request pointers, such that the requests are directed to the files associated with the second version in place of the files for the first version. For example, a first version of the virtualization platform may include 100 files, wherein 30 of the files may be updated for the second version. The thirty files that are updated may be provided to the computing systems in the computing environment and pointer configurations, including API configurations, may be updated, or modified to direct requests to the 30 files associated with the second version in place of files associated with the first version. Thus, if the first version used a first Python script and the second version used a second Python script, updates may be generated to direct requests to the second Python script in place of the first Python script.

In some implementations, an administrator may dictate the length of the of the simulated update. When the simulation ends, the administrator may indicate whether the update should be committed to the computing environment or abandoned. In the example of method 300, the method provides for identifying (301) a request to update the computing environment from a first version to a second version. In response to the request, method 300 further provides for installing (302) the updated version on each of the computing systems in the computing environment and updating the updated version with any configuration information from the cache. This may include updating addressing, information about new hosts or edge computing systems, or some other information about the environment. Once the second version is installed and any updates are applied using the cache, method 300 may remove the updated files that were used to provide the simulation and may further delete the cache associated with the simulation.

In at least one example, the cache may maintain information about the configuration changes with information about how to implement the changes in the schema associated with the second version of the virtualization platform. For example, the configuration changes may include addressing changes, information about new or modified hosts or edges, or some other configuration information. In at least one example, the cache may maintain a script or other information about how to implement the recorded changes in the updated version of the virtualized platform, wherein the updates may be implemented in a new library or other database schema associated with the updated platform.

Although demonstrated in the previous example as the user selecting the complete upgrade from the first version to the second version for the virtualization platform, the administrator may also request that the second version not be installed for the virtualization platform. In this example, when the user requests that the update not be completed, the cache and the files associated with the second updated version may be deleted or removed from the computing systems in the computing environment. Additionally, as the cache is removed, any modifications reflected in the cache may also be removed. Thus, if an additional computing system were added with the second version of the virtualization platform, the additional computing system may be removed when the update is not approved, or the simulation is completed without proceeding with the update.

Figure 4B:
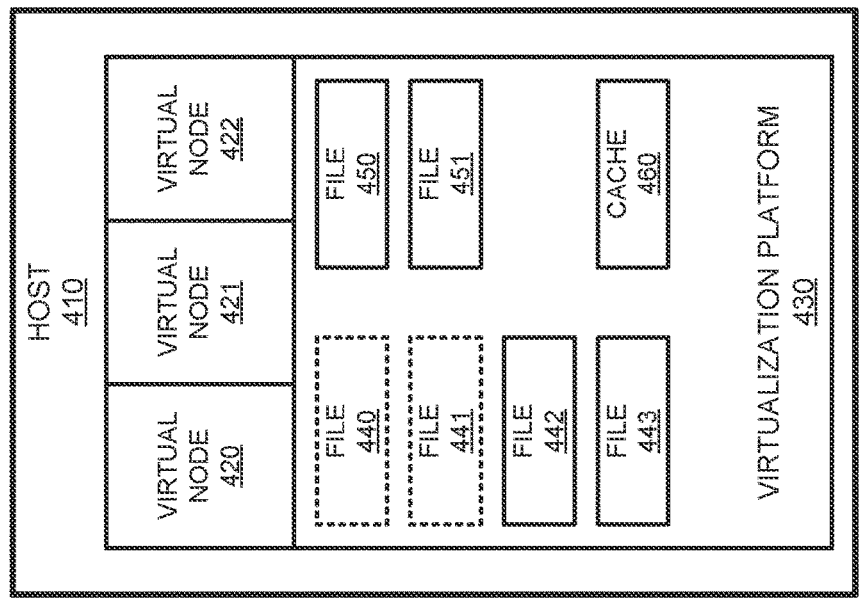
FIGS. 4A-4C illustrate an operational scenario of using a simulation to update an SDN virtualized computing environment according to an implementation.
Figure 4A:
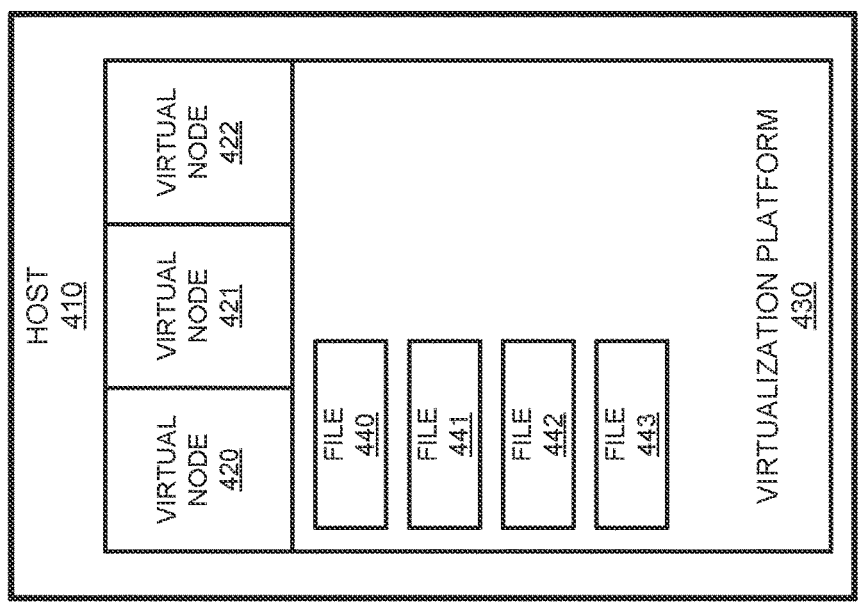
Figure 4C:
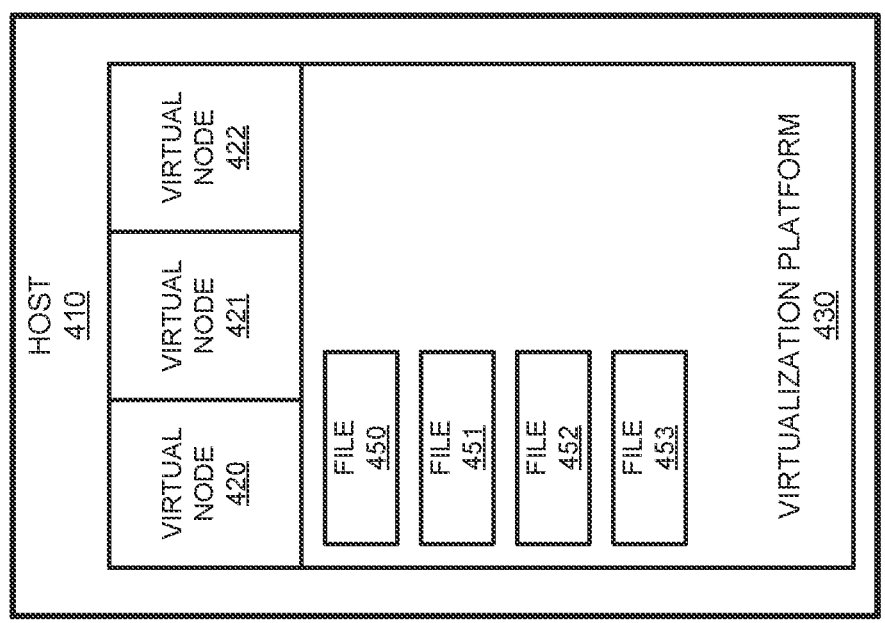

FIGS. 4A-4C illustrate an operational scenario of using a simulation to update an SDN virtualized computing environment according to an implementation. FIGS. 4A-4C include virtual nodes 420-422, virtualization platform 430, files 440-443 that are representative of files associated with a first version of virtualization platform, files 450-451 that are representative of files associated with a second version of the virtualization platform, and cache 460. Although demonstrated as providing a platform for virtual nodes, similar operations may be performed for other computing systems that provide operations associated with an SDN.

Referring first to FIG. 4A, host 410 provides virtualization platform 430 for virtual nodes 420-422. Virtualization platform 430 includes files 440-443 that are used to provide at least software defined networking operations for virtual nodes 420-422, wherein the operations may include routing, switching, encapsulation, firewall, and the like. In some examples, virtualization platform 430 may comprise a management plane, a control plane, and a data plane for the SDN. As virtualization platform 430 provides at least the SDN operations for the computing environment and host 410, an administrator of the computing environment may generate a request to simulate an update of the virtualization platform from a first version to a second version. In response to the request, an update service may identify one or more files that are different in the second version from the first version. Once identified, the one or more files may be communicated to computing systems in the computing environment. The computing systems may comprise host computing systems for virtual nodes, such as host 410, may comprise edge gateway computing systems to connect virtual machines to an outside network, may comprise management computing systems, or may comprise some other computing system in the SDN network supported by the virtualization platform.

Turning to FIG. 4B, files 450-451 are identified as different in the second version of the virtualization platform from the first version of the virtualization problem. Accordingly, files 450-451 are provided to host 410, wherein the files may correspond to executable files, library files, scripts, or some other file. The files may correspond to management plane files, control plane files, data plane files, or some other files associated with the virtualization platform. Once the files are provided to host 410, an API configuration can be updated to direct requests to 450-451 in place of files 440-441 that corresponds to the first version of virtualization platform. Specifically, when an API request is generated, the API configuration may determine a destination file for the request and direct the request to a file associated with the second version when required. In some implementations, the API configuration may be implemented as a shim layer that is used to intercept API requests and direct the requests to the appropriate file. When an updated version of a file is identified for the request, the request may be directed to the updated version in place of the original version.

In addition to implementing the API configuration to direct requests to the updated file versions, cache 460 is maintained that corresponds to configuration changes during the simulation. The configuration changes may include migration information for virtual nodes, information about new hosts or edge computing systems, or some other configuration information associated with the simulation. Cache 460 may also maintain scripts and other information for integrating the configuration change information in an updated version of the virtualization platform. Specifically, during the simulation, cache 460 may maintain information that is relevant to the configuration changes associated with the second version of the virtualization platform. When the update is requested by the user after the simulation, the scripts and the configuration information may be used to update files in a schema consistent with the second version.

Turning to FIG. 4C, after the simulation of the update from the first version of the virtualization platform to the second version of the virtualization platform, an administrator of the computing environment may request to update the virtualization platform. In response to the selection, the updated platform will be installed on host 410 replacing files 440-443 with files 450-453. In addition to replacing the files, cache 460 may be used to update the files associated with the updated virtualization platform based on the configuration information in the cache. The updates may be used to update databases and other files based on that were changed or modified as part of the simulation.

Figure 5B:
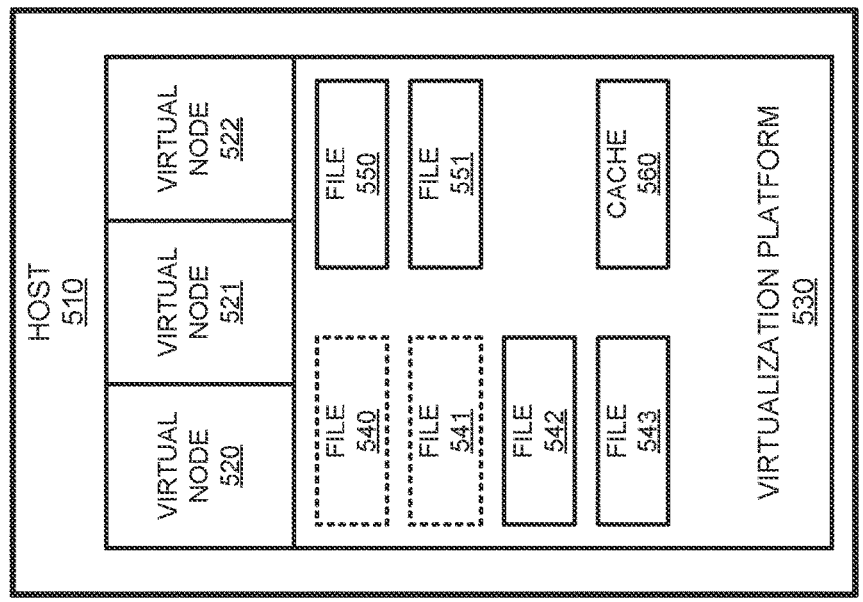
FIGS. 5A-5C illustrate an operational scenario implementing and removing a simulated update of an SDN virtualized computing environment according to an implementation.
Figure 5A:
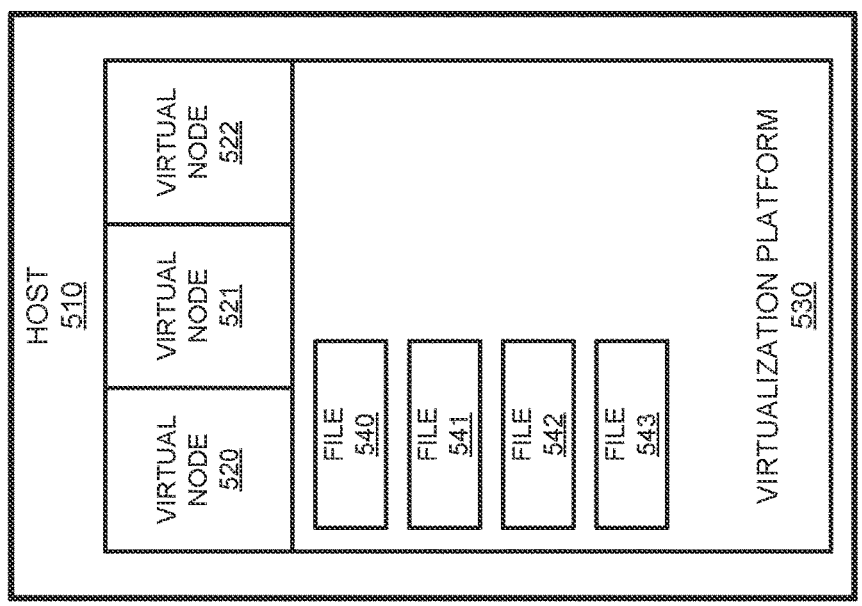
Figure 5C:
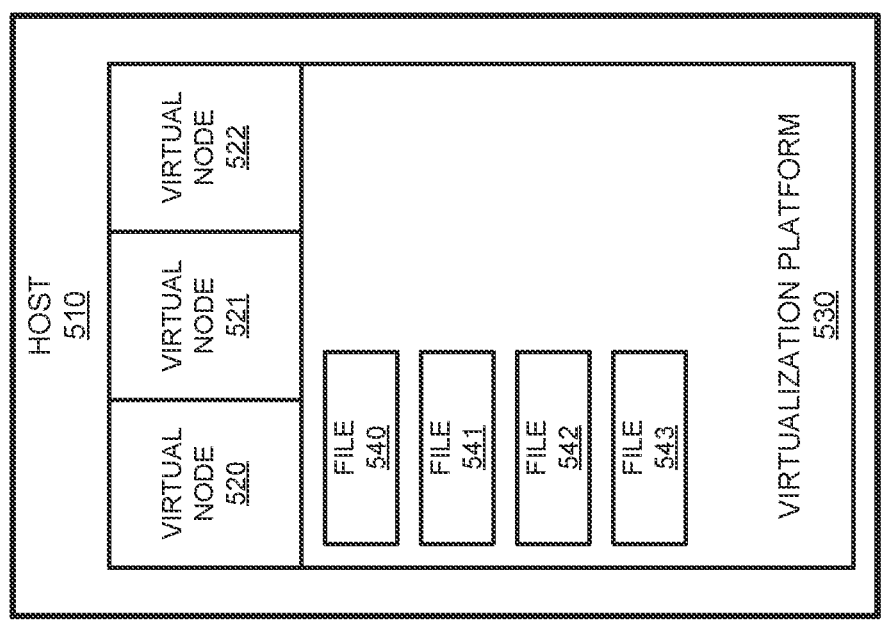

FIGS. 5A-5C illustrate an operational scenario implementing and removing a simulated update of an SDN virtualized computing environment according to an implementation. FIGS. 5A-5C include host 510 with virtual nodes 520-522 and virtualization platform 530. Virtualization platform 530 includes files 540-543 and files 550-551, cache 560. Although demonstrated with a single host, similar operations may be performed across multiple hosts or other computing systems that provide the virtualization platform.

Referring first to FIG. 5A, host 510 provides virtualization platform 530 with files 540-543 that support the operation of virtual nodes 520-522. Virtualization platform 530 may provide networking operations, including switching, routing, encapsulation, firewall, or some other operation. An administrator associated with host 510 and the computing environment may initiate a request to simulate an update to virtualization platform 530.

Turning to FIG. 5B, in response to the requested simulation, an update service will identify one or more files that are different in the second version from the first version and provide the one or more files to the computing systems in the computing environment. Here, host 510 is provided with files 550-551 that are used to act in place of files 540-541. The files may comprise executable files, library files, or some other file. Once the files are provided, API configurations can be updated at host 510 to direct requests to files 550-551 in place of files 540-541. These updates may include file path updates or other updates, wherein a request can be identified by the configuration update and directed to the files associated with the second version of the virtualization platform. For example, file 550 may represent a python file that was updated from the first version of the platform to the second version of the platform. When an API request is generated in association with python file, the update may identify the request and direct the request to file 550 in place of file 540. In some examples, the configuration update may comprise a shim layer that is a library that intercepts API requests and directs the requests to the appropriate file to provide the updated version of the virtualization platform.

In addition to updating the API configuration for the requests, cache 560 is maintained that corresponds to configuration changes during the simulated update. Cache 560 may maintain information about added hosts or edges, addressing information changes for the virtual nodes or hosts, migration changes, or some other configuration change. In some examples, cache 560 may include one or more scripts that are used to implement the configuration changes when the user requests to update virtualization platform 530. The scripts may be used to update databases and schema in the updated files when the simulation is completed, and the update is requested.

Referring to FIG. 5C, once the simulation is completed, the administrator may indicate whether to update to the second version or revert to the first version of the virtualization platform. Here, the administrator makes an indication not update to the second version. In response to the indication from the administrator, the update service may initiate an operation to remove files associated with the second version on the one or more computing systems in the computing environment, including files 550-551 on host 510. Additionally, the update service may remove the cache 560 that would be used to update the schema associated with one or more databases for the second version. Moreover, prior to updating the operation to remove cache 560 and files 550-551, the update service may update the API configuration at host 510 to direct requests to files 540-541 associated with the first version in place of files 550-551 associated with the second version.

Figure 6:
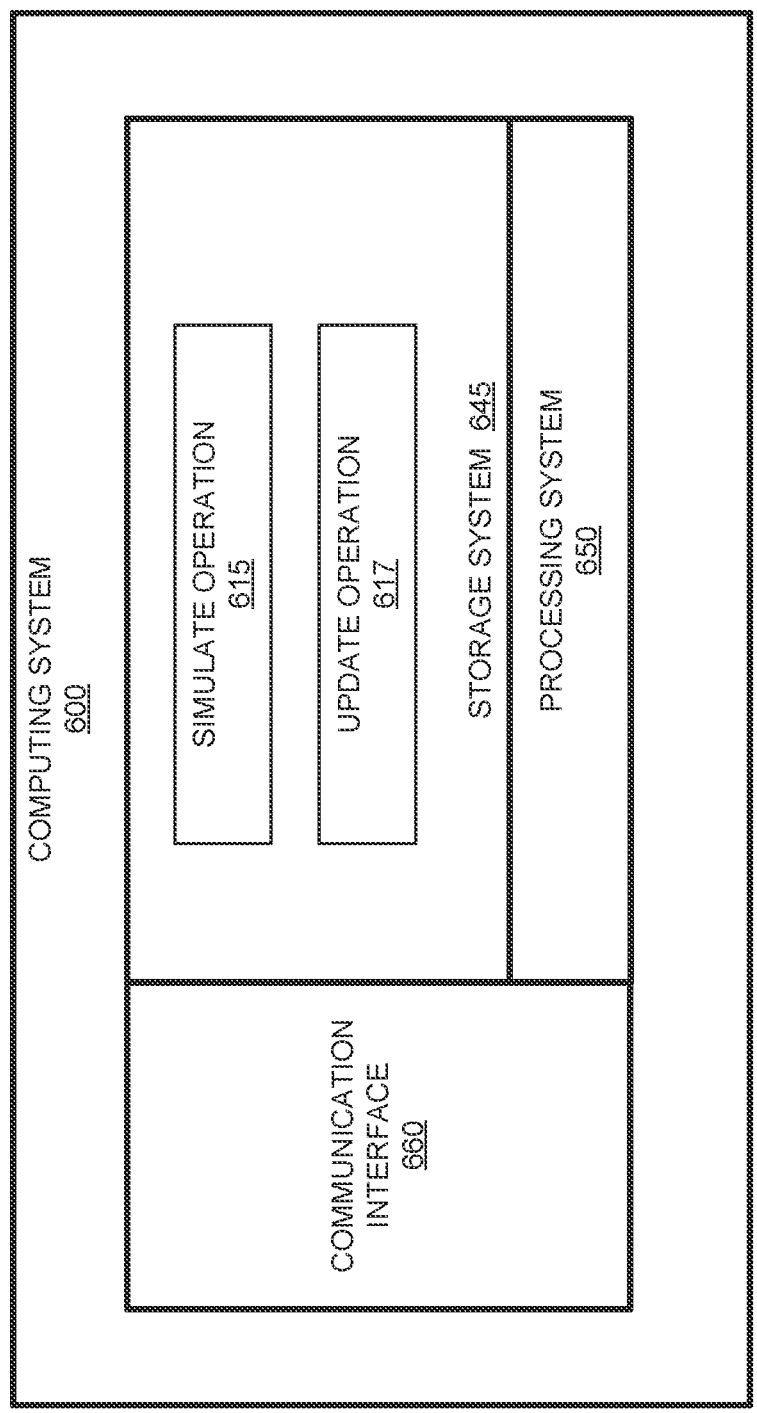
FIG. 6 illustrates a computing system to manage a simulated update to an SDN virtualized computing environment according to an implementation.

FIG. 6 illustrates a computing system 600 to manage a simulated update to an SDN virtualized computing environment according to an implementation. Computing system 600 is representative of any computing system or systems with which the various operational architectures, processes, scenarios, and sequences disclosed herein for an update service can be implemented. Computing system 600 is an example of update service 105 of FIG. 1, although other examples may exist. Computing system 600 includes storage system 645, processing system 650, and communication interface 660. Processing system 650 is operatively linked to communication interface 660 and storage system 645. Computing system 600 may further include other components such as a battery and enclosure that are not shown for clarity.

Communication interface 660 comprises components that communicate over communication links, such as network cards, ports, radio frequency (RF), processing circuitry and software, or some other communication devices. Communication interface 660 may be configured to communicate over metallic, wireless, or optical links. Communication interface 660 may be configured to use Time Division Multiplex (TDM), Internet Protocol (IP), Ethernet, optical networking, wireless protocols, communication signaling, or some other communication format—including combinations thereof. Communication interface 660 may be configured to communicate with one or more computing elements, such as server computing systems, desktop computing systems, or some other computing system capable of providing the virtualization platform.

Processing system 650 comprises microprocessor and other circuitry that retrieves and executes operating software from storage system 645. Storage system 645 may include volatile and nonvolatile, removable and non-removable media implemented in any method or technology for storage of information, such as computer readable instructions, data structures, program modules, or other data. Storage system 645 may be implemented as a single storage device but may also be implemented across multiple storage devices or sub-systems. Storage system 645 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing system 650 is typically mounted on a circuit board that may also hold the storage system. The operating software of storage systems 645 comprises computer programs, firmware, or some other form of machine-readable program instructions. The operating software of storage system 645 comprises simulate operation 615 and update operation 617. The operating software on storage system 645 may further include utilities, drivers, network interfaces, applications, or some other type of software. When read and executed by processing system 650 the operating software on storage system 645 directs computing system 600 to operate as described herein.

In one implementation, update service 615 directs processing system 650 to identify a request to simulate an update of a software defined network (SDN) virtualization platform from a first version to a second version in a computing environment. The virtualization platform can be deployed across one or more computing systems, wherein the computing systems may include host computing systems, edge gateway computing systems, or some other computing systems. In some examples, the virtualization platform may be used to provide networking operations including switching, routing, firewalls, or some other networking operation. The virtualization platform may further be used to support the execution of virtual machines, containers, or some other virtualized endpoint.

Once a request is identified, simulate operation 615 directs processing system 650 to identify one or more updated files that are different in the second version from the first version and provide the one or more updated files to one or more computing systems in the computing environment. In some examples, simulate operation 615 may compare the files of the first version to the files of the second version to identify files that are different between the first version and the second version. After identifying the files, which may comprise executables, libraries, scripts, or some other file type, the files can be provided to computing systems implementing the virtualization platform.

When the files are provided, simulate operation 615 further directs processing system 650 to update an API configuration on the one or more computing systems to direct requests to the one or more updated files in place of one or more files associated with the first version. The API configuration may comprise a shim layer that is used to identify API requests associated with the virtualization platform and direct the requests to the appropriate file. For example, if an API request were identified for library, the shim layer may identify the request, determine which library file should be used to support the request, and direct the request to the file. Thus, if a new library were provided as part of the second version, the shim layer may direct the requests to the library provided as part of the second version.

In addition to supplying the files and updating an API configuration to direct requests to updated files in place of files for the first version, simulate operation 615 further directs processing system 650 to maintain a cache for configuration changes during the simulation. The cache may include information about new hosts or edge computing systems, addressing information, or some other information about the configuration changes. The cache will also maintain information about implementing the configuration changes if the administrator confirms the update from the first version to the second version. The information may include scripts that can update data structures for the second version in a schema associated with the second version. The schema may comprise a format associated with the second version of the virtualization platform.

In some implementations, the administrator may define a period for the simulation and may select to complete the update or terminate the simulation without completing the update. If the administrator selects to terminate the simulation, the API configuration may be updated on the one or more computing systems to direct API requests to the files associated with the first version of the virtualization platform. Additionally, once the API configuration is updated, simulate operation 615 may direct processing system 650 to delete the updated files associated with the second version with the cache.

In some implementations, if the administrator indicates a desire to update the virtualization platform from the first version to the second version, update operation 617 directs processing system 650 to initiate the install of the second version on the one or more computing systems. Update operation 617 further directs processing system 650 to update the schema associated with one or more of the databases based on the information in the cache. After installing the update, update operation 617 directs processing system 650 to delete the second files used with the simulation and delete the cache. By deleting the cache, the configuration updates committed during the simulation may not be used in updating the schema associated with the first version. Thus, if a new edge gateway were added to the computing environment during the simulation, configuration information maintained during the simulation may be deleted when the update is declined by the administrator.

The included descriptions and figures depict specific implementations to teach those skilled in the art how to make and use the best mode. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
identifying a request to simulate an update of a software defined network (SDN) virtualization platform from a first version to a second version in a computing environment;
in response to the request, identifying one or more updated files that are different in the second version from the first version;
providing the one or more updated files to one or more computing systems in the computing environment; and
updating an application programming interface (API) configuration on each of the one or more computing systems to direct requests to the one or more updated files in place of one or more files associated with the first version.

2. The method of claim 1, wherein the one or more files comprise one or more executable files.

3. The method of claim 1, wherein the one or more computing systems comprise one or more host computing systems for one or more virtual machines.

4. The method of claim 1, wherein the SDN virtualization platform comprises files and libraries to support one or more virtual switches, virtual routers, or firewalls.

5. The method of claim 1, wherein the SDN virtualization platform comprises a data plane, a control plane, and a management plane.

6. The method of claim 1 further comprising:
maintaining a cache associated with modifications to the computing environment while the API configuration is updated;
identifying a request to update the SDN virtualization platform from the first version to the second version;
installing the second version of the SDN virtualization platform on the one or more computing systems; and
updating the second version based on the cache.

7. The method of claim 1 further comprising:
identifying a request to terminate the simulation of the update; and
in response to the request to terminate the simulation, updating the API configuration on each of the one or more computing systems to direct requests to the one or more files associated with the first version.

8. The method of claim 7 further comprising:
in response to the request to terminate the simulation, deleting the one or more files associated with the second version.

9. A computing apparatus comprising:
a storage system;
at least one processor operatively coupled to the storage system; and
program instructions stored on the storage system that, when executed by the at least one processor, direct the computing apparatus to:
identify a request to simulate an update of a software defined network (SDN) virtualization platform from a first version to a second version in a computing environment;
in response to the request, identify one or more updated files that are different in the second version from the first version;
provide the one or more updated files to one or more computing systems in the computing environment; and
update an application programming interface (API) configuration on each of the one or more computing systems to direct requests to the one or more updated files in place of one or more files associated with the first version.

10. The computing apparatus of claim 9, wherein the one or more files comprise one or more executable files.

11. The computing apparatus of claim 9, wherein the one or more computing systems comprise one or more host computing systems for one or more virtual machines.

12. The computing apparatus of claim 9, wherein the SDN virtualization platform comprises files and libraries to support one or more virtual switches, virtual routers, or firewalls.

13. The computing apparatus of claim 9, wherein the SDN virtualization platform comprises a data plane, a control plane, and a management plane.

14. The computing apparatus of claim 9, wherein the program instructions further direct the computing apparatus to:
maintain a cache associated with modifications to the computing environment while the API configuration is updated;
identify a request to update the SDN virtualization platform from the first version to the second version;
install the second version of the SDN virtualization platform on the one or more computing systems; and
update the second version based on the cache.

15. The computing apparatus of claim 9, wherein the program instructions further direct the computing apparatus to:
identify a request to terminate the simulation of the update; and
in response to the request to terminate the simulation, update the API configuration on each of the one or more computing systems to direct requests to the one or more files associated with the first version.

16. The computing apparatus of claim 15, wherein the program instructions further direct the computing apparatus to:
in response to the request to terminate the simulation, delete the one or more files associated with the second version.

17. The computing apparatus of claim 9, wherein the one or more files comprise one or more libraries.

18. A system comprising:
one or more computing systems that provide a software defined networking (SDN) virtualization platform; and
an update service computing system comprising at least one processor and configured to:
identify a request to simulate an update of a software defined network (SDN) virtualization platform from a first version to a second version in a computing environment;
in response to the request, identify one or more updated files that are different in the second version from the first version;
provide the one or more updated files to the one or more computing systems in the computing environment;
update an application programming interface (API) configuration on each of the one or more computing systems to direct requests to the one or more updated files in place of one or more files associated with the first version; and
maintain a cache associated with modifications to the computing environment while the API configuration is updated.

19. The system of claim 18, wherein the one or more files comprise one or more executable files or one or more libraries.

20. The system of claim 18, wherein update service computing system is further configured to:
- identify a request to terminate the simulation of the update;
- in response to the request to terminate the simulation:
  - update the API configuration on each of the one or more computing systems to direct requests to the one or more files associated with the first version; and
- delete the one or more files associated with the second version and the cache on the one or more computing systems.

\* \* \* \* \*